Nov. 29, 1960 S. KUCHINSKY 2,962,624

SIGNAL GATING AND BEAM SWITCHING CIRCUIT

Filed March 7, 1956 2 Sheets-Sheet 1

INVENTOR.
SAUL KUCHINSKY
BY Charles F. Carroll, Jr.
ATTORNEY

INVENTOR.
SAUL KUCHINSKY
BY
Charles F. Carroll, Jr.
ATTORNEY

United States Patent Office 2,962,624 Patented Nov. 29, 1960

2,962,624

SIGNAL GATING AND BEAM SWITCHING CIRCUIT

Saul Kuchinsky, Phoenixville, Pa., assignor to Burroughs Corporation, Detroit, Mich., a corporation of Michigan Filed Mar. 7, 1956, Ser. No. 570,103

4 Claims. (Cl. 315—21)

This invention relates to color television reproducers and more particularly concerns video gating and beam switching circuits for multiplexing a single electron gun and its associated beam among several different video channels, as is required for the single-gun color type tube.

The single gun, tricolor tube is described in detail in Proceedings of the Institute of Radio Engineers, vol. 41, pp. 851–858, July 1953. It uses a single beam of electrons and a conventional beam-deflecting magnetic yoke. The phosphor screen is built up of sets of three phosphor strips each strip of which fluoresces in one of the colors red, green, or blue. The sequence of strip arrangement is red, green, blue, and so on for succeeding horizontal scan lines. The color displayed at any instant is not determined by the beam deflecting structure but is determined by potentials on color control electrodes. These color control electrodes are fine wires, with a separate wire in optical alignment with each red and each blue phosphor strip. All the wires aligned with red phosphor strips are connected to one terminal of the tube's switching circuit, and all wires aligned with blue phosphor strips are connected to the other terminal of the tube's switching circuit. With a proper magnitude accelerating voltage equally applied on all wires, the beam is focused between wires, striking the green phosphor strips. If an additional potential is applied between adjacent wires, the beam will be deflected to the phosphor strip aligned with the more positive wire. The beam deflecting structure in combination with external deflecting circuits will sweep across successive or interlaced alternate sets of the three phosphor strips, in a sequence determined by the deflection scheme being used.

High resolution and fully balanced color presentation require that the electron beam be switched across all three color strips frequently enough, during each horizontal sweep or deflection of the beam, to keep successive dots of each color closer to each other than the separation a human eye can resolve. Tests have shown that, if each color is sampled at a rate of 350 or more times per line, dot separation is less than the angular resolving power of the human eye. With the middle phosphor strip illuminated every time the beam goes through zero as it is switched to the outer color strips, a full color-sampling cycle has four samples of color information. This sampling rate of 350 cycles per line corresponds to a switching rate in excess of six megacycles. By using dot interlace, the apparent dot rate can be doubled; permitting the actual switching rate to be reduced to somewhat in excess of three megacycles without apparent dot separation.

Frequent reference will be made to background data contained in the IRE's "Second Color Television Issue" of the Proceedings of the IRE, vol. 42, No. 1, pp. 299–315. On Fig. 3, p. 310, and Fig. 6, p. 312, of this reference, the switching and gating signals currently contemplated for single gun tubes are shown. Fig. 3 is for a system wherein the light outputs for each primary color are added to produce the color tube's light output. Fig. 6 is for a system wherein color-difference or chrominance signals are combined with a luminance signal within the color tube's electron gun. Inspection of the waveforms of the gating pulses shown in these reference figures reveals that they are portions of sine waves phased to reach maximum at the instant the electron beam centers on the strip of corresponding color. This arrangement provides for electron bombardment and consequent phosphor illumination of the strips for short portions of the sampling cycle's period. With such short duty cycles of illumination a large fraction of each sampling cycle is lost between illuminating gating pulses and low overall brilliance results.

An additional difficulty arises in the use of these gating signals to control video amplifiers, wherein both inputs are applied to control the gain of an amplifying device as is shown in Fig. 4, p. 311, of this "Second Color TV Issue." In this circuit, video inputs are applied to the control grid and gating signals are applied to the screen-grid of a vacuum tube. The amplitude of an output pulse will be determined by the amplitudes of both the video and the gating signals. The gating signal performs a screen-grid modulation of the output video signal. Hence, if the gating signal varies in amplitude during the gated period, the video signal will be modulated and thus distorted.

Improved gating is achieved when the "duty cycle" of electron bombardment and consequent illumination of each phosphor strip is as much of the sampling cycle as the beam switching signal will allow, without spilling over into adjacent strips as the beam is switched. The improvement is even greater when the gating circuit's transfer of video signals is not undesirably modulated by the gating signal; i.e. the gating signals turn the respective video inputs on or off but do not affect each video's amplitude while on. These improvements are achieved by this invention in its use of a magnetron beam switching tube in a novel driver circuit which provides for improved video gating and beam switching with minimum circuit complexity and with automatic synchronization.

In a copending application by Sin-pih Fan and Laurence R. Brown, titled "Synchronous Operation of Beam Switching Tubes," Serial No. 574,355, filed March 7, 1956, one method and apparatus utilizing a magnetron beam switching tube to gate video amplifiers for several video channels in synchronism with the post deflection acceleration voltage applied to the deflecting wires of a color tube was shown and described. In that application, close synchronization is achieved through use of the post deflection switching voltage for the color tube to generate the switching grid voltages for the magnetron beam switching tube which tube in turn provides an electron current which gates the video amplifiers on. For substantially equal spacing of the video gating pulses within a beam switching cycle, and to secure four color-sampling gates per cycle, that application utilizes a complex waveform comprising a mixture of fundamental and harmonic voltages provided to the grids of the magnetron beam switching tube. These voltages are adjusted to a phase angle lagging the color tube's beam switching voltage.

An object of this invention is to provide a novel signal gating and beam switching circuit wherein each signal channel and the associated beam switching voltage are gated on by a common pulse and remain activated at a fixed level until the succeeding signal channel and associated succeeding beam switching voltage are gated on with no limitation to a particular sequence or frequency.

Another object of this invention is to provide a novel video gating and color tube beam switching circuit utilizing a magnetron beam switching tube wherein complete synchronization of video gating pulses and color tube's beam switching pulses in any sequence is achieved and the voltage driving the circuit can vary in frequency or have a random recurrence rate with no deterioration of performance.

Another object of this invention is to provide a novel signal gating and ion beam switching circuit wherein each signal channel gating current and the associated beam switching voltage are provided by a magnetron beam switching tube in a square waveform to make fullest use of each gating period for "on time" and said periods can be in any selected sequence and at any frequency in a wide range or at random recurrence.

In accordance with this invention there is provided a magnetron beam switching tube and associated driver circuitry, gating signal channels and beam deflecting circuits to make fullest use of gating periods as "on time" in any selected sequence and at any frequency within a wide range.

Reference is now made to the drawings, in which.

Figure 1:
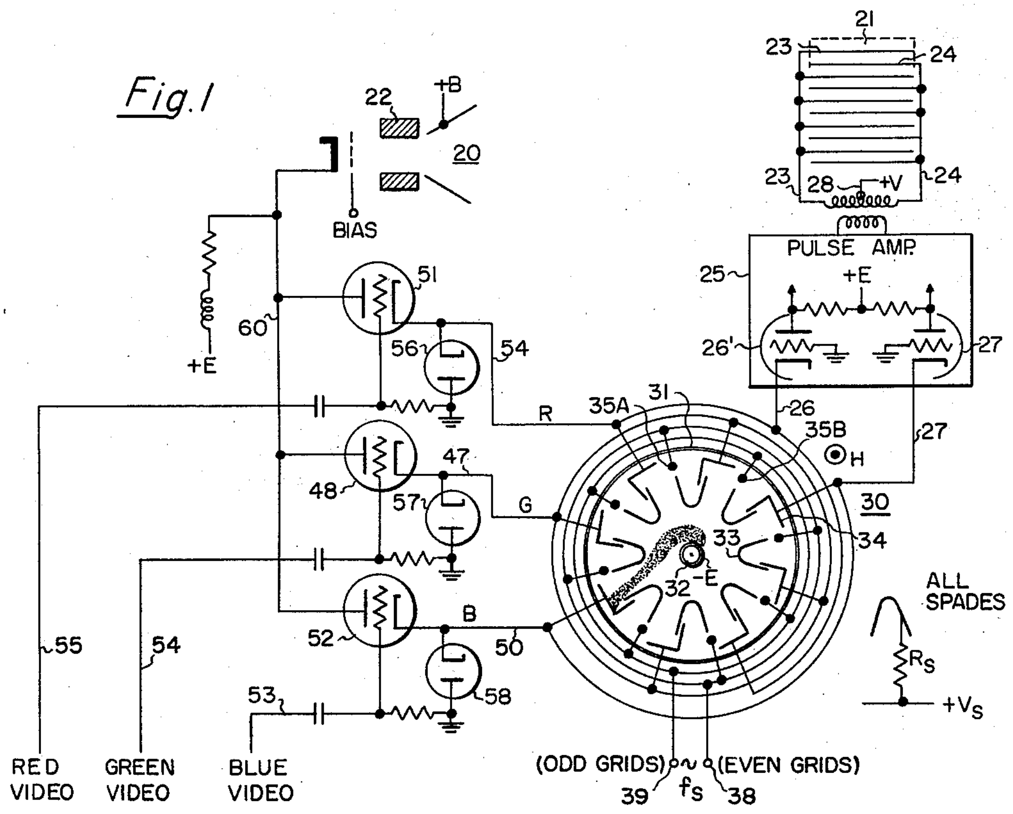
Fig. 1 is a schematic diagram of a circuit embodying this invention.

In Fig. 1, color tube 20 is shown in partial detail. The phosphor face 21 is built up out of narrow horizontal strips of different phosphors. A strip of red-fluorescing phosphor, of green-fluorescing phosphor, and of blue-fluorescing phosphor comprise the strips for each horizontal sweep-line of the tube's electron beam. The position of the beam on these three strips is not determined by deflecting means 22, but by potentials between switching wires 23 and 24 which are energized by amplifier 25 when it receives inputs on leads 26 and 27. When wires 23 and 24 are of equal potential at the level +V supplied to a center lead 28, the beam of the color tube 20 will pass between wires 23 and 24 and strike the green phosphor. When wire 23 is more positive than wire 24, corresponding to a pulse of electrons on lead 26, the color tube beam is deflected up to the red phosphor strip. When wire 24 is more positive than wire 23, corresponding to a pulse of electrons on lead 27, the color tube beam is deflected down to the blue phosphor strip.

The magnetron beam switching tube 30 is a mutli-position beam tube of the type shown and described in the U.S. Patent 2,721,955 to Sin-pih Fan et al. This tube 30 comprises an evacuated and sealed envelope 31, an elongated cylindrical cathode 32 around which are disposed coaxial and concentric arrays of electrodes. The array nearest the cathode comprises a plurality of trough shaped elements 33 with their convex surfaces facing the cathode 32. Elements 33 are commonly known as spades. Surrounding the first array is a second array of collector electrodes 34, commonly called targets. Each target 34 has a portion thereof aligned to cover the space between adjacent spades 33, and a short extension at one edge of this aligned portion which extension extends toward the concave surface of a spade. A third array of switching electrodes or grids 35 is positioned between the spades and the targets. Each grid 35 is aligned with an extending side portion of a spade 33 and near the edge of target 34 which is opposite to the short extension edge of the target. A magnetic field represented by arrowhead H permeates tube 30 with its flux flowing toward the observer of Fig. 1. The strength of field H is adjusted to about three times the magnetron cut-off value, for about +100 volts on the spades 33 relative to cathode 32. If one of the spades 33 is lowered to near zero volts relative to cathode 32, the electrons circling cathode 32 will form a beam which grazes one side of that spade and impinges upon the adjacent target 34. Once the beam is formed, a small portion of the beam falls upon the spade and produces an IR voltage drop in the series resistor connected to each of the spade electrodes and produces the IR drop which holds the beam stably in that position.

However, a negative voltage applied to the grid 35 which is nearest the target 34 which is taking the beam current, causes the beam to fan out toward that grid 35 until it strikes the next spade 33 as well. This current produces a voltage drop in this next spade which causes the beam to switch to the next target. This switching action can be continued by lowering the potential of the grid 35 which is in the same inter-spade space as is the beam, drawing the beam over to the next spade and thence to the next target. Similar voltage variation on any grid other than the one near the electron beam does not cause this switching until the beam switches into the inter-spade space nearest to such a grid. The beam switches from one target to the next within a microsecond of when the grid reaches switching potential, and remains on this next target in a stable condition until the next grid is lowered to switching potential. With a proper sequence of switching potentials on sequential grids 35, the electron beam advances clockwise around tube 30, energizing each target 34 in succession. By applying a suitable bias to the switching grids, the beam can be made to step around from one position to the next without any additional switching voltage; a self-oscillating or self-switching condition.

Figure 4:
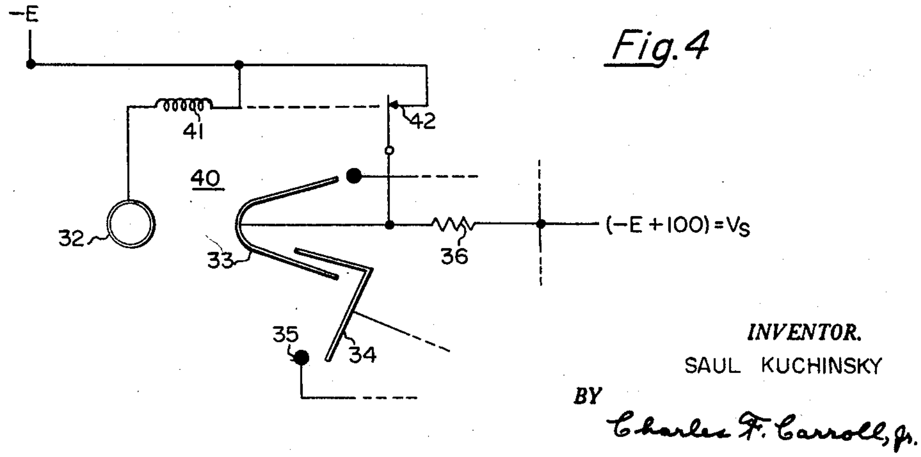
Fig. 4 is a schematic diagram of a beam forming circuit.

The initial depression of the voltage of one spade in order to form the beam can be done by a variety of manual or automatic methods. A typical method is as shown in Fig. 4, where the winding 41 of relay 40 is in series with circuit connections to cathode 32. Contact 42 is closed when relay 40 is not energized, thereby holding spade 33 at ground potential. As cathode 32 warms up and emits electrons, the electrons form a beam which grazes spade 33 and hits target 34. This beam current flows through winding 41, and opens contacts 42, but the beam remains stably upon spade 33 and target 34 due to the IR voltage drop it causes in resistor 36. Upon lowering the potential of grid 35, this beam is switched to the next target, now shown in Fig. 4. If for any reason the beam is momentarily cut off, relay 40 closes and the whole cycle repeats. Winding 41 can be in series with the target circuit and actuate the same starting function.

Figure 2:
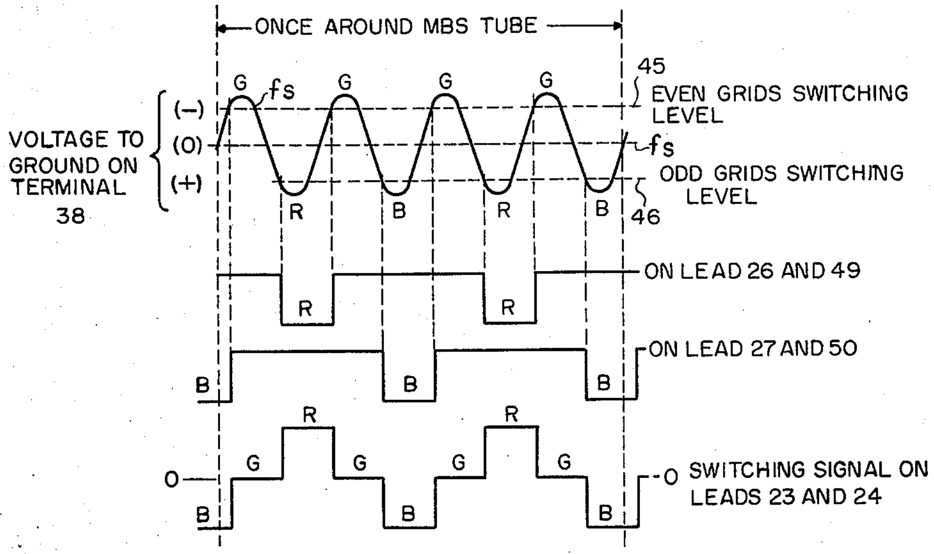
Fig. 2 is a graphical presentation of the waveforms utilized and produced by the circuit of Fig. 1.

Switching grids 35 are connected together into two circuits of alternate grids. Grid 35A and each alternate grid thereafter are connected to terminal 38 and are referred to as the "even" grids. Grid 35B and each of the remaining other grids which also form a pattern of alternate grids are connected to terminal 39 and are referred to as the "odd" grids. With the tube's electron beam stably held on a target as shown in Fig. 1, an alternating voltage $f_s$ of sufficient amplitude can be applied to terminals 38 and 39, applying its negative going potential alternately to each terminal, and the tube's beam will switch to the next target in the clockwise direction every half cycle. For example, with the beam held on a "blue" target as shown, and when $f_s$ starts its negative half cycle no terminal 38 as shown in Fig. 2, the switching grid nearest the beam will draw the beam over to strike the adjacent spade when switching level 45 is reached. Since the next switching grid is connected to terminal 39 and would be at a positive potential at this instant, the beam switches only the one position, to a "green" target. On the next half cycle, terminal 39 receives the negative-going potential and will switch the beam to a "red" target when switching level 46 is reached. This push-pull drive on the "even" and "odd" sets of alternate grids thus insures a positive switch of one position and an equally positive restraint to only one position, every half cycle of $f_s$. This control feature is useful where dot or line interlace is used and rigid synchronization with another frequency is required.

Alternate targets 34 are connected to common lead 47 which connects to "green" video amplifier 48. The remaining targets 34 are connected alternately to common leads 49 and 50. Lead 49 connects to "red" video amplifier 51, and lead 50 connects to "blue" video amplifier 52.

In addition to these gating control connections to the video amplifiers, lead 49 connects to lead 26 and lead 50 connects to lead 27, to drive pulse amplifier 25 which provides the switching signals to wires 23 and 24. When the "red" video is gated on, the pulse on lines 49 and 26 produces a positive pulse on lead 23 relative to lead 24, to deflect the color tube's beam up to the red phosphor strip. When the "blue" video is gated on, the pulse on lines 50 and 27 produces a positive pulse on lead 24, to deflect the color tube's beam down to the blue phosphor strip. When the "green" video is gated on, amplifier 25 is quiescent and leads 23 and 24 are at potential +V supplied on lead 28.

Again considering the situation as shown in Fig. 1, with the beam of tube 30 formed on a target connected to lead 50, it will be seen that there are several cathode-to-plate conduction paths. The cathode-to-plate conduction path of tube 30 begins with cathode 32 at voltage −E and ends with target 34. The cathode-to-plate path of tube 52 is in parallel with the cathode-to-plate path of tube 27′ in amplifier 25, and these parallel paths start with the target 34 connected to lead 50 and end at a potential +E after going through plate loads. Considering the voltage divisions which occur along this path from −E to +E, lead 50 is at, or nearly at, ground potential when the beam is as shown. When the beam switches to some other target, lead 50 will become positive and will cut off tubes 52 and 27′. However, with the beam on the target connected to lead 50, electrons are supplied to tube 52 and video signals coming in on lead 53 are provided in amplified form on common output lead 60. In a similar manner, electrons are supplied to the cathode of ground-grid amplifier tube 27′ to drive amplifier 25 and produce a positive pulse on lead 24. Since the outputs from the targets 34 of tube 30 are essentially square waves, these gating and switching pulses will be essentially square waves so that little time is lost between "on" or "duty" times for the several video channels. Diode 58 becomes conducting when electron current flows through lead 50. The total current capacity of tubes 52 and 27′ is less than the current supplied by tube 30, so some electrons will flow through diode 58 to ground. With diode 58 conducting, the cathode of tube 52 is clamped to a definite potential level between −E and +E and tube 52 functions with improved dependability.

As the signal $f_s$ switches the beam to successive targets around tube 30 from the position shown in Fig. 1, lead 47 receives electron current and through the conduction of diode 57 clamps the cathode of amplifier tube 48 to a fixed potential near ground. The green video signals applied to tube 48 on lead 54 then appear on lead 60 as an amplified video signal. Upon switching the beam to the next target, lead 49 receives electron current and renders tube 51 and diode 56 conductive. With the cathode of tube 51 clamped near ground potential, the red video signals applied on lead 55 appear on lead 60 as an amplified video signal. As the beam leaves each target, the associated amplifier is cut off very quickly. Thus, the switching of the beam gates amplifiers on, to amplify video signals in the sequence "blue-green-red-green, etc."

Figure 3:
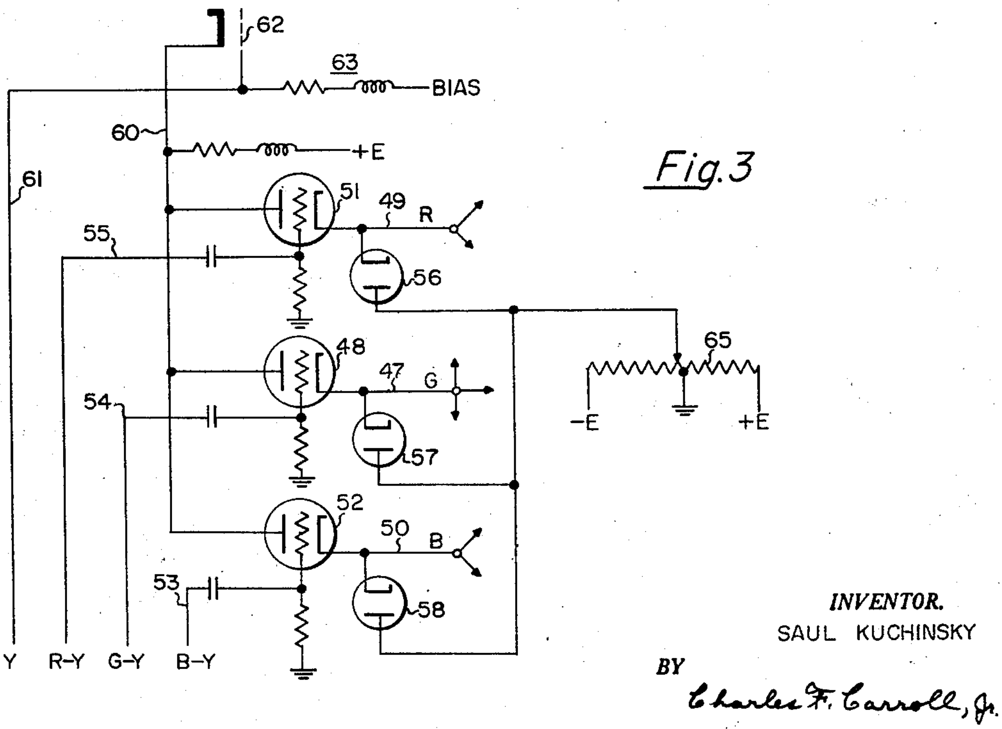
Fig. 3 is a partial schematic diagram of a circuit embodying this invention for use with different input signals.

Fig. 3 shows the gated amplifiers of Fig. 1 as they are connected to handle "color-difference plus luminance" type of color television signals. Instead of red, green and blue video signals, leads 53, 54 and 55 receive the color difference signals for these respective colors, $R-Y$ being red minus luminance, $G-Y$ being green minus luminance, and $B-Y$ being blue minus luminance. The grid 62 of the color tube is not simply connected to a bias supply, but is connected to the bias through an impedance 63, and the luminance signal Y is applied to grid 62 through lead 61. These signals are mixed within the tube to reproduce the balanced color signal representative of what was picked up by the television cameras. The bias on impedance 63 is adjusted to give the net grid-to-cathode voltage required for optimum color tube performance.

The color tube post deflection beam switching amplifier 25 continues to receive switching signal pulses on lines 26 and 27 from the $R-Y$ and $B-Y$ gating leads 49 and 50 respectively.

With color-difference plus luminance type video signals, the color-difference channels and associated amplifiers must be capable of handling both positive-going and negative-going signals since these difference signals can have either polarity. Accordingly, tubes 51, 48 and 52 must operate about a bias which produces pulses of a mean value when no signal is applied on leads 55, 54, and 53, respectively. Potentiometer 65 is connected to diodes 56, 57 and 58, enabling them to clamp to a proper bias potential when activated, to produce the mean-value pulse each time the magnetron beam tube strikes the associated targets and provides electron current through leads 49, 47 and 50 respectively. Alternately, the grid resistors of each of the tubes 51, 48 and 52 could be connected to a bias potential and diodes 56, 57 and 58 grounded as in Fig. 1.

The post deflection acceleration wires 23 and 24 can be arranged vertically in a color tube, with the color phosphor strips also in a vertical arrangement to provide the same relative positions for wires and strips. Post deflection aceleration then is along the same line as the horizontal sweep. Low frequencies, comparable to horizontal sweep frequency have been used on this arrangement and provide useful color pictures of a line-sequential presentation. It is within the scope of this system to apply a frequency comparable to frame frequency, to provide frame-sequential presentation.

What is claimed is:

1. A signal gating and beam switching circuit comprising a magnetron beam switching tube having a cathode, a plurality of beam forming and holding electrodes, a plurality of switching grids and a plurality of target electrodes, a first input terminal connected to alternate switching grids, a second input terminal connected to the remaining switching grids, a first output connection to alternate target electrodes, a second output connection to alternate target electrodes of the remaining target electrodes, a third output connection to other target electrodes of the remaining target electrodes, a plurality of signal amplifiers each having an input terminal connected to receive signals, an output terminal connected to a common output lead and a gating control terminal connected to one of said output connections to target electrodes to receive electrons therefrom, a picture-producing cathode ray tube having means for producing an electron beam and a screen for receiving said beam and electrode means adjacent to said screen for controlling the position of an electron beam on the screen, and separate current flow control means coupled between said second and third output connections and said last-named electrode means, the operation of said current flow control means being synchronized with the operation of said signal amplifiers.

2. A signal gating and beam switching circuit comprising a magnetron beam switching tube having a cathode, a plurality of beam forming and holding electrodes, a plurality of switching grids, and a plurality of target electrodes; a first input terminal connected to alternate switching grids; a second input terminal connected to the remaining switching grids; a first output connection to alternate target electrodes; a second output connection to alternate target electrodes of the remaining target electrodes; a third output connection to other target electrodes of the remaining target electrodes; a plurality of signal amplifiers each having an input terminal connected to receive signals, an output terminal connected to a common output lead and a gating control terminal connected to one of said output connections to receive electrons therefrom; a picture-producing cathode ray tube including a multiple color producing picture screen, electrode means for generating a picture-tube electron beam adapted to scan said picture screen, and beam-positioning electrodes adjacent to said screen for controlling the position of said picture-tube electron beam on one or another of the three parts of said screen; and separate current flow control means between said second output connection and said beam-positioning electrodes and between said third output connection and said beam-positioning electrodes; the operation of said current flow control means being synchronized with the operation of said signal amplifiers.

3. A signal gating and beam switching circuit including an electron beam switching tube having a cathode and a plurality of groups of electrodes; each group including a target electrode which receives an electron beam and produces an output signal therefrom, a spade electrode which holds an electron beam on its asssociated target electrode, and a switching electrode which serves to switch an electron beam from one group of electrodes to the next; a single gun color-type cathode ray tube adapted to receive color information signals and having a phosphor screen comprising a plurality of phosphor areas adapted to produce light of different colors, said cathode ray tube also including a plurality of sets of beam positioning electrodes for controlling the phosphor areas on which an electron beam impinges; a separate gate amplifier for each of the color information signals to be applied to said cathode ray tube and coupled thereto; means coupled to said gate amplifiers for maintaining them turned off normally; said target electrodes of said beam switching tube being connected in a plurality of sets with one set being coupled both to one gate amplifier and to one set of beam positioning electrodes of said cathode ray tube whereby said one gate is caused to pass intelligence to said cathode ray tube at the same time that an electron beam in said cathode ray tube is positioned on the proper corresponding phosphor area, another set of target electrodes being coupled both to a gate amplifier and to one set of said beam positioning electrodes in said cathode ray tube; another set of target electrodes being coupled to a gate amplifier; and means coupled to the switching electrodes of said beam switching tube for switching an electron beam from position to position therein in synchronism with the application of information signals to each of said gate amplifiers whereby output signals from said beam switching tube to said gate amplifiers and to said beam controlling means in said cathode ray tube coincide with the application of said information signals to said gate amplifiers.

4. A signal gating and beam switching circuit including an electron beam switching tube having a cathode and a plurality of groups of electrodes; each group including a target electrode which receives an electron beam and produces an output signal therefrom, a spade electrode which holds an electron beam on its associated target electrode, and a switching electrode which serves to switch an electron beam from one group of electrodes to the next; a single gun color-type cathode ray tube adapted to receive color information signals and having a phosphor screen comprising a plurality of phosphor areas adapted to produce light of different colors, said cathode ray tube also including a plurality of sets of beam positioning electrodes for controlling the phosphor areas on which an electron beam impinges; a separate gate amplifier for each of the color information signals to be applied to said cathode ray tube and coupled thereto; means coupled to said gate amplifiers for maintaining them turned off normally; said target electrodes of said beam switching tube being connected in a plurality of sets with one set being provided for and coupled to each gate amplifier whereby each gate amplifier is turned on, two of said sets of target electrodes being coupled each to one set of beam positioning electrodes of said cathode ray tube so that an electron beam in said cathode ray tube is positioned on the proper phosphor area when the corresponding gate amplifier is turned on; and means coupled to the switching electrodes of said beam switching tube for switching an electron beam from position to position therein in synchronism with the application of color information signals to each of said gate amplifiers whereby output signals from said beam switching tube to said gate amplifiers and to said beam controlling means in said cathode ray tube coincide with the application of said color signals to said gate amplifiers.

References Cited in the file of this patent

UNITED STATES PATENTS

| | | |
|---|---|---|
| 2,662,175 | Staal | Dec. 8, 1953 |
| 2,680,778 | Werenfels | June 8, 1954 |
| 2,719,229 | Adler | Sept. 27, 1955 |
| 2,721,293 | Gow | Oct. 18, 1955 |
| 2,721,955 | Fan et al. | Oct. 25, 1955 |
| 2,777,897 | Gretener et al. | Jan. 15, 1957 |
| 2,839,702 | Fan et al. | June 17, 1958 |
| 2,840,633 | Railbourn | June 24, 1958 |
| 2,841,644 | Biggs | July 1, 1958 |
| 2,863,939 | Jones | Dec. 9, 1958 |
| 2,877,376 | Orthuber | Mar. 10, 1959 |